Feb. 28, 1950 W. A. MUELLER ET AL 2,498,895
PROJECTION FILM VIEWER AND REPRODUCING SYSTEM
Filed Nov. 22, 1947 4 Sheets-Sheet 1

INVENTORS
William A. Mueller
Joseph T. Wissman

Feb. 28, 1950 W. A. MUELLER ET AL 2,498,895
PROJECTION FILM VIEWER AND REPRODUCING SYSTEM
Filed Nov. 22, 1947 4 Sheets-Sheet 2

INVENTORS
William A. Mueller
Joseph T. Wissman

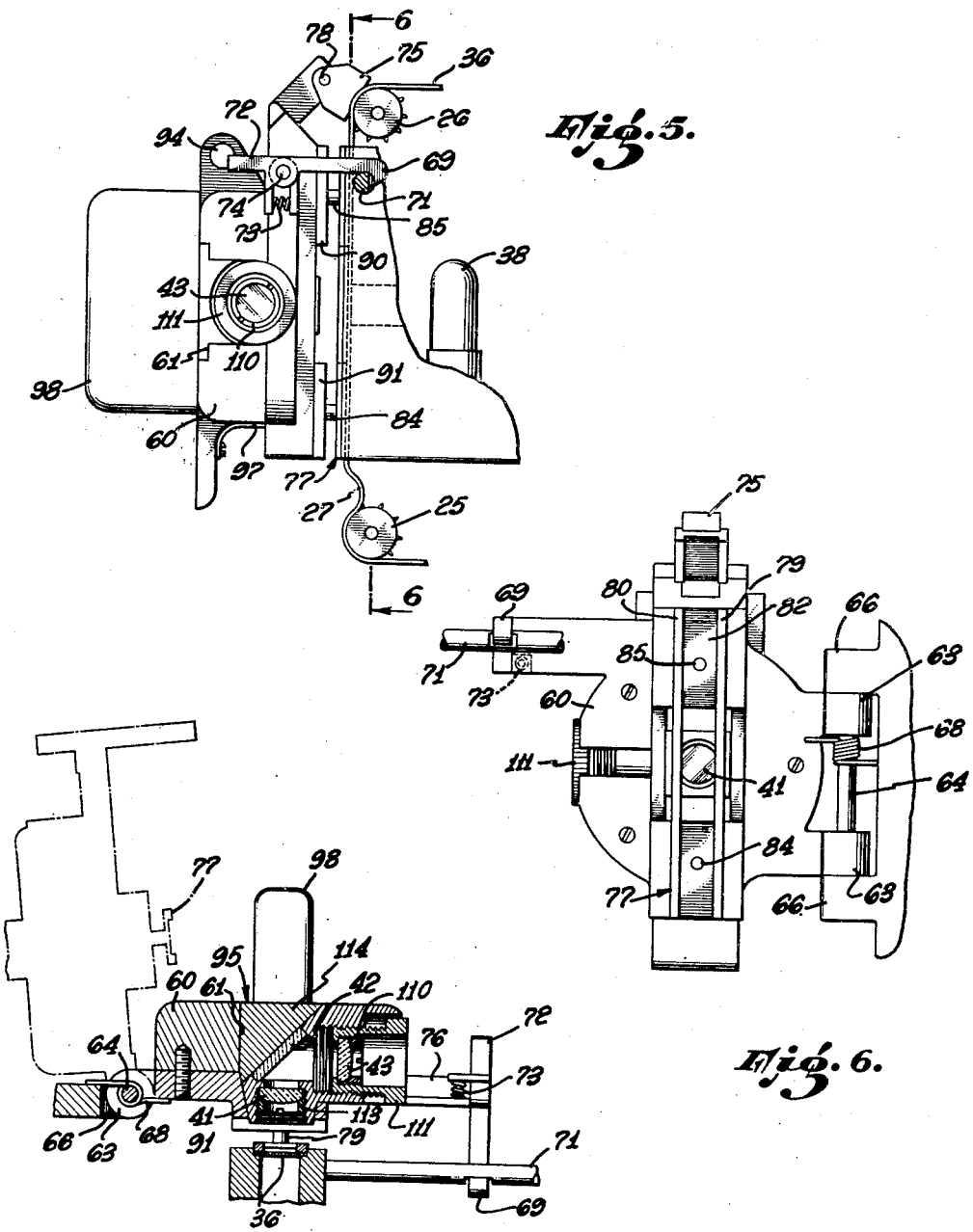

Feb. 28, 1950 W. A. MUELLER ET AL 2,498,895
PROJECTION FILM VIEWER AND REPRODUCING SYSTEM
Filed Nov. 22, 1947 4 Sheets-Sheet 4

INVENTORS
William A. Mueller
Joseph T. Wissman

Patented Feb. 28, 1950

2,498,895

UNITED STATES PATENT OFFICE 2,498,895

PROJECTION FILM VIEWER AND REPRODUCING SYSTEM

William A. Mueller, Los Angeles, and Joseph T. Wissmann, Burbank, Calif., assignors to Warner Brothers Pictures, Inc., Burbank, Calif., a corporation of Delaware Application November 22, 1947, Serial No. 787,540

14 Claims. (Cl. 88—16.2)

This invention relates to motion picture apparatus, and particularly to editing or reviewing equipment which facilitates the viewing and editing of certain sequencies in an especially convenient manner.

It is well-known that editing devices are used in the production of motion pictures, these devices permitting the viewing of the pictures on the film strip either individually or in motion, and magnified either through a lens over the film or as projected to a screen. Generally, the concomitant sound is reproduced simultaneously, the present invention, however, being directed particularly to the picture unit, any standard sound reproducer being suitable. The combination picture viewer and sound reproducer is portable and arranged so as to provide a convenient projection throw, while providing a light shield for the picture to permit its use in daylight or on a brilliantly lighted stage.

Another feature of the device is the gate through which the film passes for projection, this gate permitting easy access to a particular frame for marking the frame without the film's being released from its fixed position in the gate. The gate is also provided with a switching arrangement which reduces the intensity of the light source so that the operator may view the frame directly in a preferred illuminated condition. The device is easily threadable, and the optical train and shutter unit are designed to provide an image of maximum brilliancy with a light source of minimum intensity. Each element of the system is easily accessible for cleaning or repair when necessary. The entire unit is enclosed in a box which may be contracted to enable its being easily transported between different review rooms or between different stages wherever it is to be used.

The principal object of the invention, therefore, is to facilitate the viewing and editing of motion picture film.

Another object of the invention is to provide an improved motion picture editing projector in combination with a concomitant sound reproducer.

A further object of the invention is to provide an improved motion picture editor which permits the projection of the picture and easy access to any particular frame for marking purposes.

A still further object of the invention is to provide an improved optical projection path with automatic projection light control.

A still further object of the invention is to provide an improved motion picture editor which is portable and easily maneuvered.

Although the novel features which are believed to be characteristic of this invention will be pointed out with particularity in the appended claims, the manner of its organization and the mode of its operation will be better understood by referring to the following description read in conjunction with the accompanying drawings, forming a part hereof, in which:

Fig. 5 is a side, elevational view taken along the line 5—5 of Fig. 4.

Fig. 6 is a rear elevational view of the hinged gate showing the pressure pad and taken along the line 6—6 of Fig. 5.

Fig. 7 is a cross-sectional view showing the optical elements carried by a portion of the gate, and taken along the line 7—7 of Fig. 4.

Figure 1:
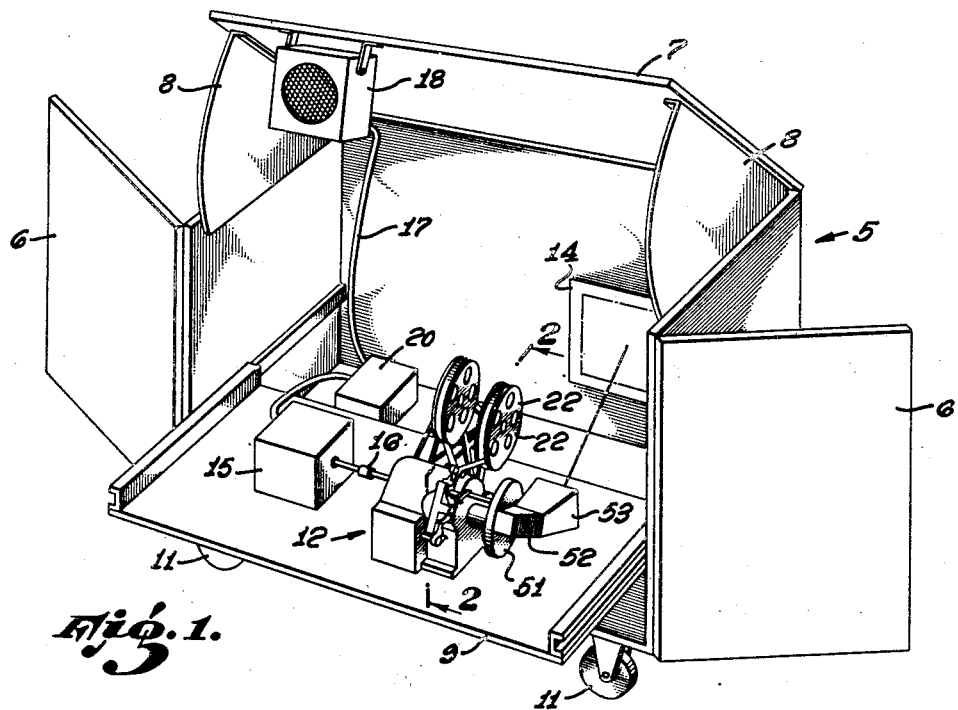
Fig. 1 is a perspective view of an editing device of the invention arranged in operable position.

Referring now to the drawings, in which the same numerals identify like elements, a rectangular box-like housing or cabinet 5 has hinged front doors 6, a hinged top 7 with light excluding segments 8 attached thereto, and a slidable platform 9. The box or cabinet is mounted on wheels such as shown at 11 so that the cabinet may be easily moved from place to place. Mounted on the sliding platform 9 is the motion picture projection unit 12 of the invention, which projects a picture to a screen 14 mounted on the rear wall of the cabinet. The reproducer for the concomitant sound track is shown diagrammatically as a box 15 positively connected through a shaft 16 to the projection unit so that the sound and picture films run synchronously.. The sound reproducing unit 15 may be of any standard type, the output thereof being conducted over cable 17 through any standard type of amplifier 20 to a loud speaker 18 mounted on the cover 7. By mounting the units 12 and 15 on the slidable platform, the projection throw is increased to provide a larger and sharper picture on the screen 14, while easier access is had to the units for threading the film therethrough and for controlling their operation. The cover 7 with its segments 8 provides a light shield for the picture, permitting the picture to be viewed under well-lighted room conditions. When the platform 9 is slid within the box 5, the cover lowered, and the doors 6 closed, the unit forms a rectangular cabinet which may be easily and quickly moved to another location without damage to any of the elements or without any disconnecting of the units.

Figure 2:
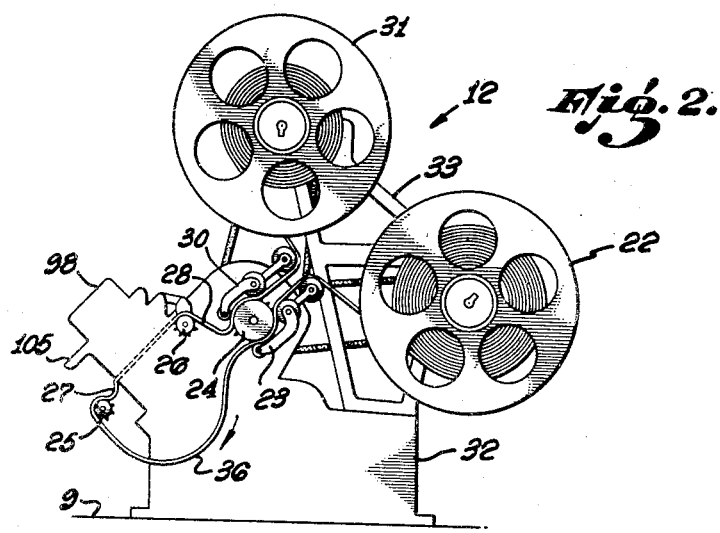
Fig. 2 is an elevational view taken along the line 2—2 of Fig. 1.
Figure 11:
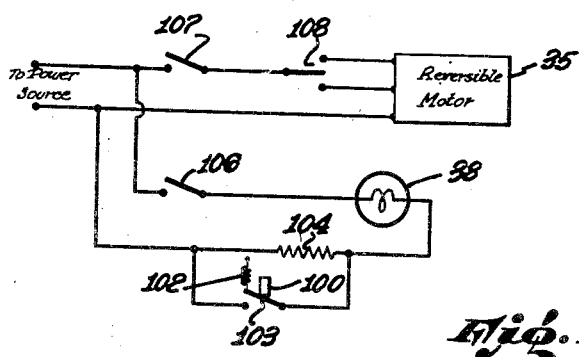
Fig. 11 is a schematic circuit diagram for the driving motor and the projection lamp.
Figure 8:
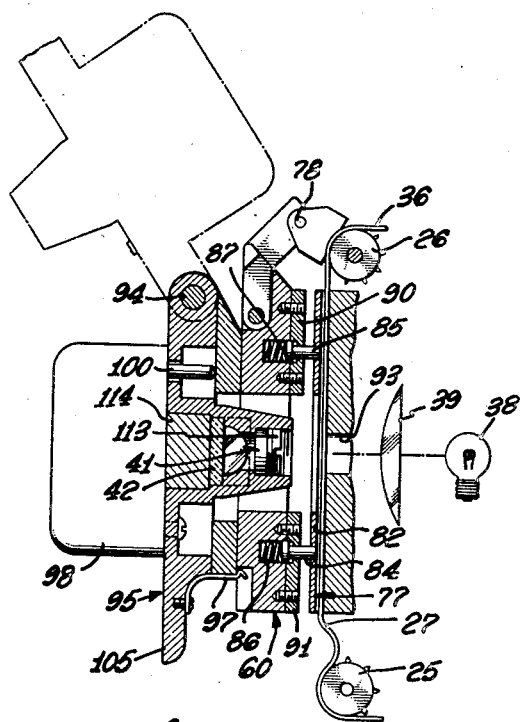
Fig. 8 is a cross-sectional view of the gate and pressure pad taken along the line 8—8 of Fig. 4.
Figure 9:
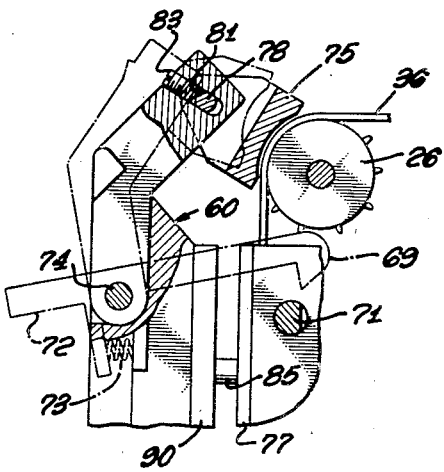
Fig. 9 is a detail view of the sprocket film shoe and latch arrangement for the gate.
Figure 10:
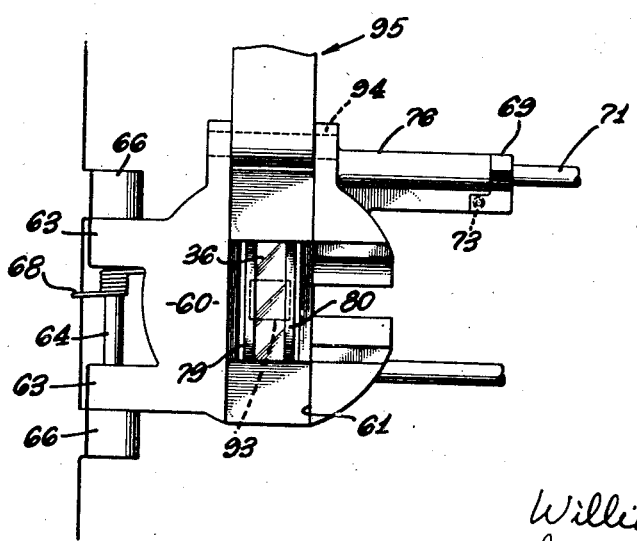
Fig. 10 is a front view of the pressure pad portion of the gate.

Referring now to Fig. 2, a general arrangement of the picture projection unit is shown wherein a supply reel 22 supplies film over a guide and pad roller unit 23 around a continuous sprocket 24, then to another continuous sprocket 25, where it passes through the gate, being pulled therethrough by an intermittent sprocket 26. Loops are provided at 27 and 28 to permit intermittent operation, the film then passing again over continuous sprocket 24 under a pad and guide roller 30 to the take-up reel 31. The mechanism is mounted on a framework 32 and 33 having the usual type of driving motor 35 (see Fig. 11) with the usual gears for interconnecting the motor with the drive sprockets. Thus, when a picture film 36 is threaded through the unit 12 with the start mark thereon corresponding with the start mark in the sound reproducing unit 15, the picture will be projected in synchronism with its concomitant sound.

Figure 3:
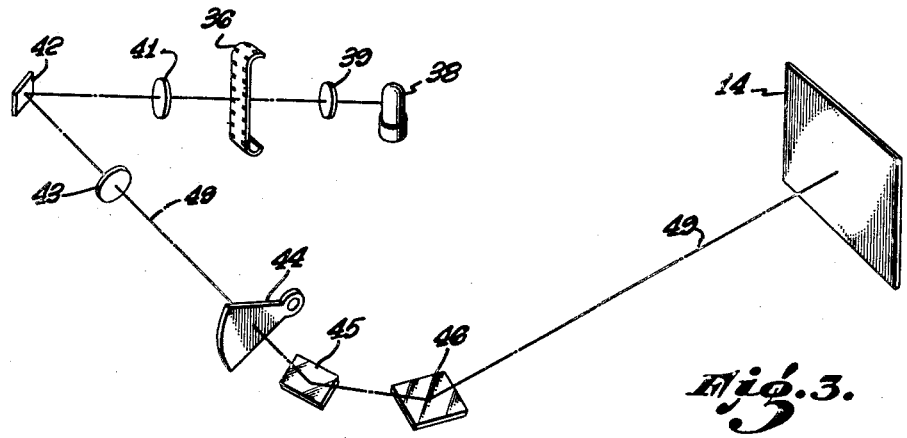
Fig. 3 is a schematic view of the optical portion or train of the invention.
Figure 4:
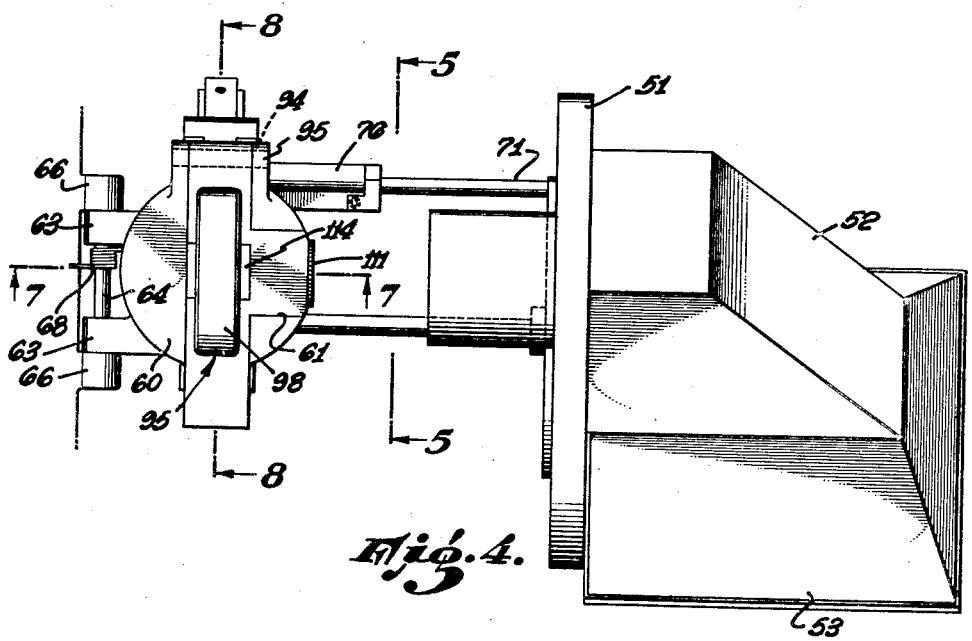
Fig. 4 is a front, elevational view of the gate and casing of projection elements of the invention.

Referring now to Fig. 3, the optical path of the picture projection unit is shown as including a light source 38 with a condenser lens or lenses 39 which project light through the film 36, the light then being projected by a lens 41 to the reflecting mirror 42, and through a lens 43, past a single bladed shutter 44, and then to two reflecting mirrors 45 and 46 to the screen 14, the central ray of the optical path being indicated by the broken line 49. The condenser lens 39 may be gold coated to reduce infrared light radiation on the film to minimize the heating thereof. The use of a single bladed shutter increases the screen illumination. Referring again to Fig. 1, the shutter 44 is located within the housing 51, the mirror 45 being positioned on the end surface of the housing 52 and the mirror 46 on the bottom surface of the housing 53. The lenses 41 and 43 and the mirror 42, as positioned in the gate, are shown in Fig. 7. The projection path, therefore, is through the film, through the lenses 41 and 43 and mirror 42 in the gate, then past shutter 44 and mirrors 45 and 46 to the screen 14. This is a comparatively simple projection path which minimizes light losses and provides a sharp picture on the screen 14, particularly with coated lenses and mirrors to increase light transmission.

Referring now to the film gate, reference being made particularly to Figs. 4 to 10, inclusive, a bracket or casting 60 forming one part of the film gate, has a T-shaped slot 61 therein (see Fig. 10) hinged by ears 63 on a pin 64 mounted on bosses 66 on the frame of the projector. A spring 68 aids in opening the bracket 60 when a latch 69 is released from a pin 71 by pressure on the end 72 of the latch. A compression spring 73 maintains the hook of the latch in position. The latch 69 is fixedly mounted on a rod 74 rotatable in the sleeve 76 of the bracket 60 and on the end of which is pivoted at 78 a shoe 75 for holding the film 36 on the intermittent roller 26. The pivot 78 is under the tension of a spring 81 adjustable by a screw 83. Thus, to open the bracket 60 and swing it on the shaft or pin 64, the end 72 of latch 69 is depressed, thus rotating shaft 74 which first raises the shoe 75 from the film before the entire bracket is swung open.

The bracket 60 carries a film pressure shoe or pad 77 which bears against the film 36, while in the gate, the shoe is made up of two runners 79 and 80 (see Fig. 6) and a back plate 82 from which extend two supporting rods 84 and 85 which are spring pressed by springs 86 and 87 in apertures in the bracket 60. (See Fig. 8.) A pair of plates 90 and 91 limit the movement of the pins 84 and 85 under the tension of the springs when the gate is open, the pad 77 thus remaining in position at all times. When the bracket 60 is latched in position, the film is under the tension of springs 86 and 87.

Hingedly mounted at 94 on the bracket 60 is an optical element supporting bracket 95 forming part of the film gate, this bracket, as shown in cross-section in Fig. 7, carries lenses 41 and 43 and reflector 42. The bracket 95 is latched in position by a spring latch 97 and also carries on the upper or back surface thereof a microswitch box 98 having an actuating plunger 100, the plunger being actuated outwardly to an open position by a spring 102. (See Fig. 11.) The lower end 105 forms a handle to lift the bracket 95 and rotate it to the position shown by the dotted lines in Fig. 8. Thus, when the bracket 95 is in closed position on the bracket 60, the contact 103 is closed, and a resistor 104 is short circuited. The short circuiting of the resistor 104 puts the entire voltage from the power source across the lamp 38 when a manual switch 106 is closed. The purpose of this microswitch arrangement is to reduce the energy to the lamp 38, thus reducing its intensity to permit viewing a picture frame aperture 93 at the time the bracket 95 is opened. This avoids the operator's looking into the full brilliancy of the light 38 used to project pictures on the frame 14. To complete the circuit shown in Fig. 11, when a manual switch 107 is closed, power is supplied to the reversible motor 35 to operate it in either of two directions, depending upon the position of a reversing switch 108.

In Fig. 7, it is noted that the lens 43 is mounted in a holder 110, which, in turn, is mounted on a threaded unit 111 adjustable in the bracket 95. Similarly, lens 41 is mounted in a threaded holder 113, mirror 42 being cemented to the 45 degree side of a block 114 mounted in the bracket 95.

From the above description, it is realized that the picture editing device just described permits the positioning of the film 36 in the projector, projects the pictures to the screen 14 in a manner where they can be readily and easily observed, permits the direct viewing of a definite frame for the purpose of marking the frame, while maintaining the frame in its fixed position in the aperture, and makes the film aperture easily accessible for threading and removing the film for cutting purposes. The entire projector may be rapidly threaded and unthreaded, and, when threaded, permits the film to be easily marked and cut, which is required in the editing of motion pictures. It is suitable either for 35 or 16 mm. film, it being particularly advantageous for 16 mm. film in view of the projection of the picture to a large observable size. The entire unit is portable, and may be used for directors in showing previous sequences or as an editing device for the cutters when desired.

We claim:

1. A film editing machine comprising a frame, a light source mounted on said frame, a screen positioned at a distance behind said frame, means for advancing film above said light source, an optical system for projecting light emerging from said film to said screen, said system including a fixed condenser lens on said frame and movable projection optics positions above said film, and a film gate, said gate having two parts, one part being hinged on said frame for holding said film in position above said condenser lens, and the other part being hinged on said first part for positioning said projection optics of said optical system for projecting the image on said film to said screen.

2. A film editing machine in accordance with claim 1, in which said first mentioned part of said gate includes a film pressure pad for holding said film in position, said part having a central and side apertures therein for accommodating said second mentioned part, and said second mentioned part being hinged at right angles on said first mentioned part and exposing the projection aperture when removed from the apertures of said first mentioned part.

3. A film editing machine in accordance with claim 2, in which a switch is provided on said second mentioned part, said switch being automatically closed when said second part is in position in the apertures of said first mentioned part, the closing of said switch energizing said light source to normal projection intensity, said light source being below the projection intensity of said lamp when said second part is out of the apertures of said first mentioned part.

4. A film editing device comprising a frame, a light source mounted on said frame, means for advancing a film above said light source, a screen positioned at a distance behind said device, a right angle optical system for projecting light from said film to said screen, said optical system including a fixed condenser lens between said film and said light source and movable projection lenses and a reflector above said film, and a gate through which said film is advanced, said gate having a pressure pad section and an optical section including said projection lenses and said reflector, said optical section being mounted on said pressure pad section and insertable therein, removal of said optical section providing access to the frame of said film in the projection aperture.

5. A film editing device in accordance with claim 4, in which a switch is provided on said optical section, said switch being closed when said optical section is inserted in said pressure pad section to increase the energization of said light source to normal projection intensity, said light source being below said normal projection intensity when said optical section is removed from said pressure pad section.

6. A film editing device in accordance with claim 4, in which a cabinet is provided for said device, said screen being mounted on the rear wall of said cabinet, said cabinet having a slidable platform on which said device is mounted for extending the projection throw of said optical system.

7. A motion picture film projection and sound reproducing device comprising a portable cabinet having a top adapted to be raised, said top having sectors attached to the ends thereof to exclude light from said cabinet, front doors and a slidable platform for said cabinet, a picture projection unit, a sound reproducing unit, means for driving said units in synchronism, said units being mounted on said slidable platform, a loud speaker mounted on the under-side of said cover of said cabinet for reproducing sound from said sound reproducing unit, and a screen on the rear wall of said cabinet for observing pictures projected from said picture projection unit, the forward extendible position of said platform increasing the size of the picture on said screen from that obtainable when said platform is not extended.

8. A device in accordance with claim 7, in which said picture projection unit includes an optical system including a light source under the film to be projected, right-angle projection optical elements above said film, a shutter in the horizontal light path, and right-angle reflection optical elements for projecting said pictures to said screen.

9. A film viewing machine comprising a light source, means for advancing film past a light aperture above and illuminated by said light source, an energy source and circuit for energizing said light source at two intensities, a gate unit above said film and having two parts, one of said parts supporting a pressure pad for guiding said film past said aperture and the other of said parts supporting projecting lenses and a reflector for directing light emerging from said film at substantially right angles to the direction of said light through said film and substantially horizontal, a shutter in said horizontal light path for interrupting said light, light deflection means for directing said light at substantially right angles to the horizontal direction of said light past said shutter, and a screen at the rear of said unit on which said light is impressed.

10. A film viewing machine in accordance with claim 9, in which said last mentioned means includes a flared integral housing, one of said mirrors being mounted on the closed end wall of the smaller section of said housing and another of said mirrors being mounted on the bottom wall of the larger section of said housing, said shutter being provided with a housing adjacent the open end of said smaller section of said housing.

11. A film viewing machine in accordance with claim 9, in which a switch is provided on said second mentioned part of said gate and included in said light source energizing circuit, said switch being opened by the separation of said second mentioned part of said gate from said first mentioned part to expose said film in said aperture for viewing and marking, said switch decreasing the energy to said light source to reduce the illumination of said film at said light aperture.

12. A motion picture editing device comprising a frame, film advancing means mounted on said frame, a light source, means for forming an aperture past which film is advanced and through which light from said source is projected, the line of light projection to said aperture being upwardly at substantially 45 degrees to the horizontal, a film gate for maintaining said film in said aperture, said gate including projecting lenses and an intermediate reflector for projecting light passing through said aperture in a horizontal direction, a light interrupting shutter in the horizontal light path, and a screen positioned at the rear of said device for observing images formed by said light, said gate including means for removing said optical elements while maintaining said film in position in said aperture for direct observation.

13. A motion picture editing device in accordance with claim 12, in which means are provided for energizing said light source at two intensities, said means including a resistor and a switch for short circuiting said resistor, said switch being mounted on said gate and short circuiting said resistor to increase the illumination of said film by the positioning of said optical elements in position to project said light to said screen and inserting said resistor in said energizing means when said optical elements are removed from projecting position to decerase the illumination of said film for the direct observation thereof.

14. A portable motion picture film viewer and sound reproducer comprising a rectangular cabinet having a top adapted to be raised, said top having light excluding side portions, front doors, and a slidable platform, a picture projector mounted on said platform, a sound reproducer mounted on said platform, a screen on a wall of said cabinet under said top, a loud speaker connected to said reproducer, and an interconnection between said projector and said reproducer to advance films therethrough in synchronism, said picture projector projecting a picture to said screen and said loud speaker reproducing the sound for said picture.

WILLIAM A. MUELLER.
JOSEPH T. WISSMANN.

REFERENCES CITED

The following references are of record in the file of this patent:

UNITED STATES PATENTS

| Number | Name | Date |
|---|---|---|
| 1,858,555 | Owens | May 17, 1932 |
| 1,954,787 | Bright et al. | Apr. 17, 1934 |
| 2,074,991 | Salcedo | Mar. 23, 1937 |
| 2,150,992 | Scott | Mar. 21, 1939 |
| 2,211,218 | Serrurier | Aug. 13, 1940 |
| 2,218,256 | Betchel | Oct. 15, 1940 |
| 2,297,222 | Kemna | Sept. 29, 1942 |
| 2,361,398 | Harris et al. | Oct. 31, 1944 |
| 2,381,997 | Bolsey | Aug. 14, 1945 |
| 2,424,339 | Stechbart et al. | July 22, 1947 |